United States Patent [19]

Myhr

[11] 4,331,309
[45] May 25, 1982

[54] PROGRAMMED AIRCRAFT ARRESTING SYSTEM

[75] Inventor: Lars H. Myhr, Newark, Del.

[73] Assignee: All American Engineering Company, Newark, Del.

[21] Appl. No.: 121,386

[22] Filed: Feb. 14, 1980

Related U.S. Application Data

[63] Continuation of Ser. No. 926,451, Jul. 20, 1978, abandoned.

[51] Int. Cl.³ .......................... B64F 1/02; F16F 57/04
[52] U.S. Cl. .............................. 244/110 A; 188/296; 244/110 C
[58] Field of Search ........... 244/110 R, 110 A, 110 C; 188/280, 290, 296, 299

[56] References Cited

U.S. PATENT DOCUMENTS

| | | | |
|---|---|---|---|
| Re. 28,736 | 3/1976 | Myhr et al. | 188/296 |
| 3,142,458 | 7/1964 | Byrne et al. | 244/63 |
| 3,317,164 | 5/1967 | Marcheron | 244/110 R |

Primary Examiner—Charles E. Frankfort
Attorney, Agent, or Firm—Connolly and Hutz

[57] ABSTRACT

A variable K factor energy absorber for an aircraft arresting system has a movable control element which is moved into different positions to adjust the K factor. The movement of the control element is programmed during payout of the arresting system in accordance with the speed of the arrested aircraft. The speed is sensed by a pump driven by the arresting gear tape reel. The program is provided by a cam (also driven by the tape reel through a reduction gear). The control element is moved by a hydraulic drive actuated by an electrical shifting switch, which is triggered when the detected speed of the arrested aircraft exceeds the predetermined speed established by a cam during initial and final phases of payout. The control element is thereby moved from an initial low K to an intermediate K position during the initial phase of payout if the predetermined speed established by the cam is exceeded. During the final phase of payout, the switch shifts the control to the high K position if the predetermined speed is exceeded. The cam also causes the control element to be driven to a high K position at the end of payout if it is not already there. The hydraulic drive shifts from an initial high speed to low speed operation during the final phase of payout. Rewind is accomplished by actuating the drive system to set the control element in the low K position to minimize the required rewind force.

19 Claims, 2 Drawing Figures

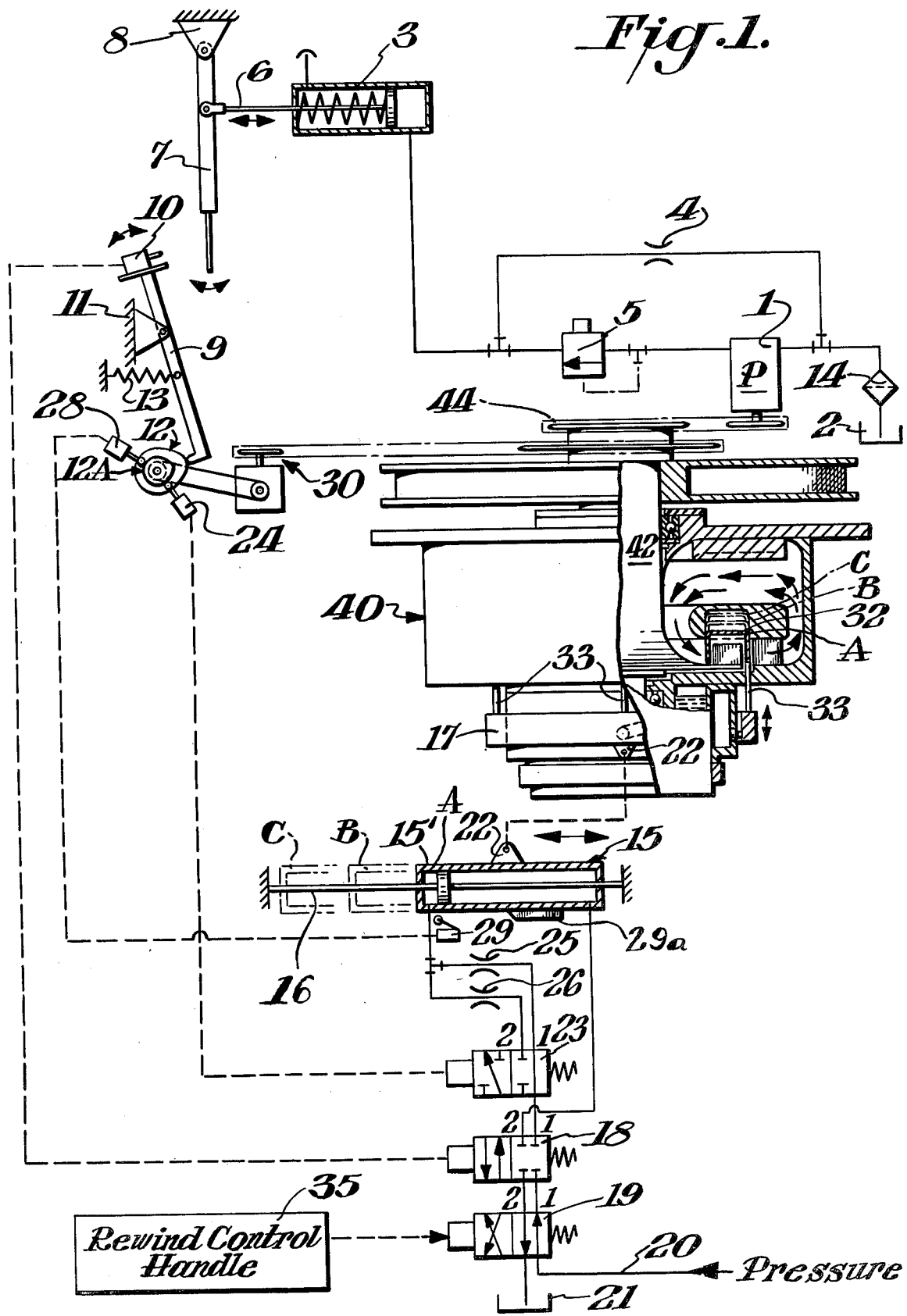

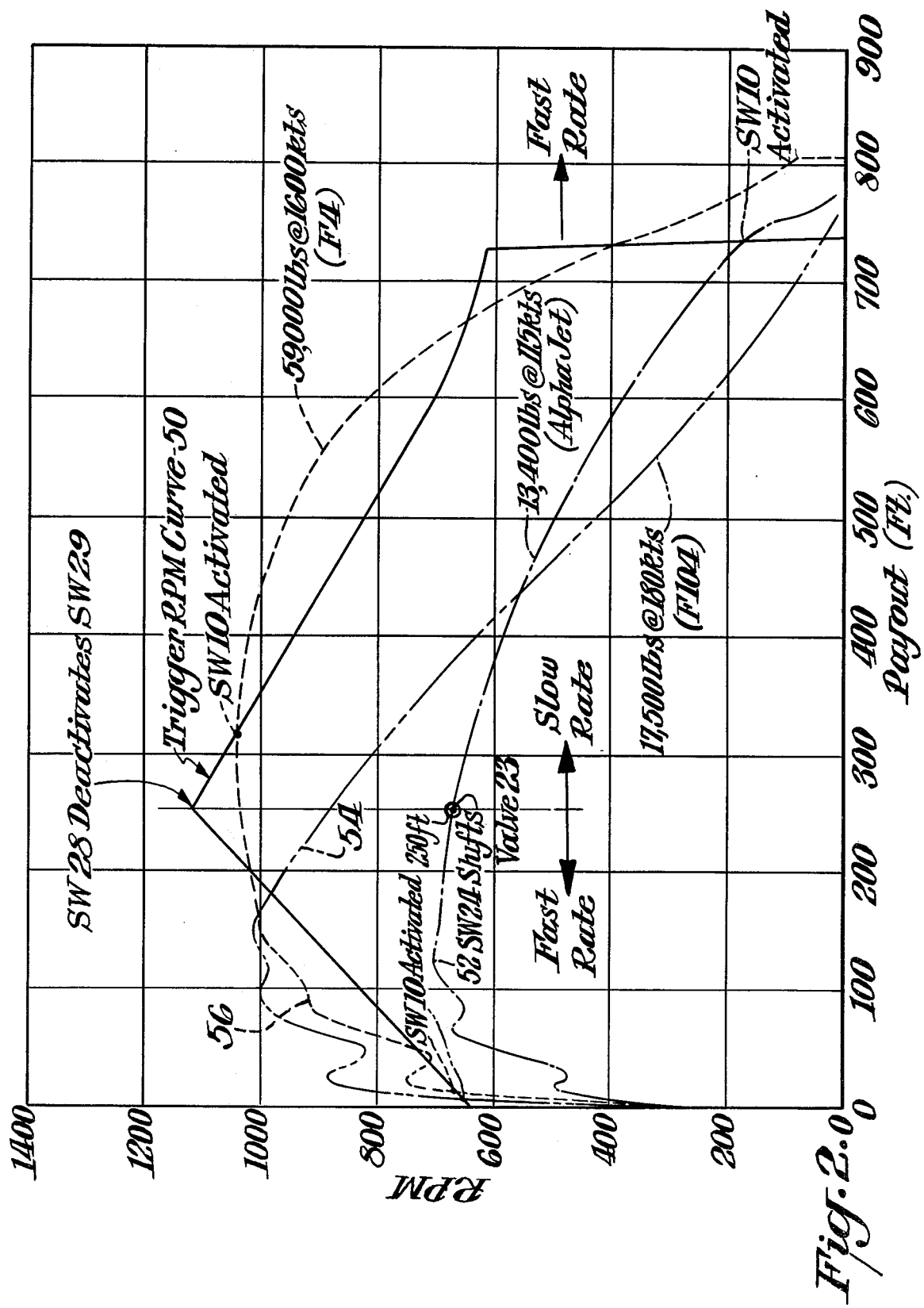

PROGRAMMED AIRCRAFT ARRESTING SYSTEM

CROSS REFERENCE TO RELATED APPLICATIONS

This application is a streamline continuation of Ser. No. 926,451, filed July 20, 1978 by the same inventor now abandoned.

BACKGROUND OF THE INVENTION

Various programmed arrangements have been proposed for aircraft arresting systems for equalizing the arresting forces applied during payout. In other words, light restraints are initially applied while the aircraft is still travelling at a high speed and greater restraints are applied as the speed of the aircraft decreases. Examples of such programmed systems are described in U.S. Pat. Nos. 2,843,288 and 3,142,458. Such systems are not as efficient as desired and are not readily adaptable to a wide range of aircraft weights and landing speeds. An object of this invention is, therefore, to provide a programmed control system which efficiently arrests a wide range of aircraft weights and speeds. Another object is to provide a simple, economical and dependable type of such a system.

SUMMARY OF THE INVENTION

A programmed aircraft arresting control system for a variable K factor energy absorber having a movable control element which is movable into a number of positions, each causing the energy absorber to operate at a different K factor, utilizes a programming means establishing a predetermined speed parameter for an arrested aircraft. The speed parameter has different phases of arrestment, for example, an initial and a final phase. A speed-sensing means, for example, a pump driven from the arresting tape reel, determines the instantaneous speed of the arrested aircraft. A comparison means, for example a linkage driven by the pump, compares the instantaneous speed with the corresponding portion of the speed parameter of the program (for example cam and follower) whereby aircraft speeds in excess of the parameter are detected. An actuating means including, for example a switch between the linkage and cam follower and associated solenoid valves and electrical circuitry, causes the control shroud to move to a predetermined higher K position if the speed parameter is exceeded in a corresponding phase of arrestment. In other words, the cam has a contour which defines an initial arresting phase and a final arresting phase. The switch on the cam follower and additional follower switches, solenoid valves and circuitry are constructed and arranged to actuate the drive means to set the control element in the low K position at the beginning of the initial phase, in an intermediate position if the speed parameter is exceeded during the initial phase, and in a high K position if the speed parameter is exceeded during the final phase. The control element is moved to the high K position at the end of the final phase if it is not already there. The actuating means also includes, for example, a limit switch which defines the intermediate position and a disabling switch connected to the limit switch, which may be actuated during the final phase. The drive system has slower and faster rates of movement with the slower rate only provided during the final phase of arrestment. The drive means also, for example, may include a movable cylinder shell and a fixed piston. A rewind control causes the control element to be set in its low K position to facilitate rewind.

BRIEF DESCRIPTION OF THE DRAWINGS

Novel features and advantages of the present invention will become apparent to one skilled in the art from a reading of the following description in conjunction with the accompanying drawings wherein similar reference characters refer to similar parts and in which:

FIG. 1 is a schematic diagram of a programmed aircraft arresting system, which is one embodiment of this invention in conjunction with the variable K energy absorber; and FIG. 2 is a chart of rpm vs. payout for three different aircraft relative to a trigger rpm curve utilized on the cam shown in FIG. 1.

DESCRIPTION OF THE PREFERRED EMBODIMENT

The control device shown in FIG. 1 may for example, be positioned in a housing (not shown) installed on top of the energy absorber 40 and may be anchored to its foundation by means of an unillustrated pipe bracket which also functions as a conduit for electric connectors between the control device and shroud control cylinder 15.

As shown in FIG. 1, connected to the shaft 42 of energy absorber 40 by belt transmission 44 is a speed sensing means such as hydraulic pump 1 with its inlet port via filter 14 connected to reservoir 2 and with its outlet port connected to spring-returned cylinder 3. The inlet port and the outlet port of the pump 1 are connected via a fixed restriction 4 and a pressure relief valve 5.

Pump 1 drives a comparison means comprising the following linkage: piston rod 6 is attached to lever 7 which pivots in fixed bracket 8. Cam follower 9 carrying microswitch 10 is pivoted around fixed bracket 11 and held against cam 12 by spring 13.

Dual cams 12 and 12A are rotated by shaft 42 of energy absorber 40 via a gear and timing belt transmission 30 so that cam 12 rotates less than 360° for about 80 revolutions of absorber shaft 42. Two more follower switches 24, and 28 are installed in contact with a smaller cam 12A.

Energy absorber 40 is, for example, of the type described in U.S. Pat. No. Re. 28,736. The shroud mechanism disposed inside the housing of energy absorber 40 includes a movable control element such as shroud 32 with three positioning rods 33 operated by cam ring 17. Cam ring 17 is rotated by cylinder 15. Cylinder rod 16 is fixed to the absorber housing at each end of cylinder shell 15' which is connected to cam ring 17 via bracket 22.

Actuating means for cylinder 15 are as follows. The two ports of cylinder 15 are via solenoid valve 18 and solenoid valve 19, connected to pressure line 20 and reservoir 21. Another solenoid valve 23 is connected to one of the ports via restrictor 25 and a restrictor 26.

The position of lever 7 is a function of shaft rpm as a consequence of the flow-dependent pressure drop across orifice 4. The positions of cam follower 9 and switch 10 are a function of the purchase tape payout (number of revolutions of absorber shaft 42) for a given cam 12 profile. The orifice 4 size and cams 12 and 12A profiles are matched so that switch 10 is activated when shaft rpm exceeds the trigger curve in FIG. 2 for a given payout.

The status of switch 24 is a function of the purchase tape payout (number of revulutions of the absorber shaft 42).

During stand by the positions of the solenoid valves are as follows.

Valve No. 18: Position 1—No Flow
Valve No. 19: Position 1—No Flow
Valve No. 23: Position 1—High Flow Rate Cylinder 15 is in its right-hand or "A" position which provides an almost closed "A" position of shroud 32 resulting in the lowest of three K-positions.

When engaging a light low-speed aircraft (Alpha-Jet), the rpm vs. payout curve as shown in FIG. 2 results in no status change of shroud 32 until a payout of 735 ft. is reached. Solenoid valve 23 will, as a result of cam 12A actuating switch 24, shift to low flow rate position 2 at 250 ft. payout and back again to high flow rate position 1 at 735 ft. payout. However, as a result of the position of valve 18 (no flow), this has no effect on cylinder 15 before 735 ft. payout.

When reaching 735 ft. payout, cam 12 actuates solenoid valve 18 via switch 10 causing a flow through liquid orifice 25 to the left-hand chamber of cylinder 15 moving shell 15' to the left, fully opening shroud 32 to the "C" (maximum K) position. Switch 28 is actuated by cam 12A overriding switch 29, which already has been actuated by shell 15'. This allows shroud 32 to open completely resulting in the maximum K-factor at the end of the runout.

Restrictors 25 and 26 provide different cylinder 15 velocities and cam 12A is designed to activate solenoid 23 via switch 24 at 250 ft. payout and deactivate solenoid 23 at 735 ft. payout.

When engaging a medium weight high speed aircraft (F-104), the rpm vs. payout curve shown in FIG. 2 results in an early (before 250 ft. payout) crossover of the trigger rpm curve. Solenoid valve 23 is consequently in position 1 when switch 10 shifts solenoid valve 18 to flow. This results in a high rate K-increase (through restrictor 25). When the intermediate K-factor is reached, switch 29 is activated to shift valve 18 back to "no flow" and stop cylinder shell 15'.

When a payout of 735 ft. is reached, switch 28 through cam 12A overrides switch 29 to shift valve 18 to flow, thus moving cylinder shell 15' and shroud 32 to their "C" positions and increasing the K-factor to its highest value.

When engaging with a heavy weight high speed aircraft (F-4) the rpm vs. payout curve shown in FIG. 2, results in an early crossover (before 250 ft. payout) followed by a late (after 250 ft. payout) crossover of the trigger rpm curve.

Before 250 ft. payout, solenoid valve 23 is in position 1 when switch 10 shifts solenoid valve 18 to flow. This results in a fast K-increase (through restrictor 25).

When the intermediate K-factor or "B" position is reached, switch 29 is activated by contact with projection 29a on cylinder 15, shifting valve 18 back to no flow to stop cylinder shell 15' in the "B" position. Reaching a payout of 250 ft. cam 12A actuates switch 24 shifting valve 23 to position 2 resulting in a lower rate of K-increase (through orifice 26) when switch 10 at the second crossover overrides switch 29 changing valve 18 to flow causing shell 15' and shroud 32 to move their "C" positions. The K-factor increases to its maximum value and consequently no reaction occurs at the third crossover (after 735 ft. payout) except that switch 24 shifts valve 23 back to position 1.

During rewinding after an arrest, a switch in rewind control handle 35 actuates valves 18 and 19 to position 2 resulting in a closing of shroud 32 to the "A" (low K) position. After completing rewinding and pretensioning, all valves are automatically reset to their standby position.

FIG. 2 shows four curves, Peaked trigger rpm curve 50 represents the contrours of dual cams 12 and 12A. It accordingly establishes speed limits for the arrested aircraft through payout expressed in rpm of the tape reel. The maximum speed of approximately 1100 rpm is established at 250 ft. of payout. The contours of curve 50 are developed to accommodate an engagement made at the velocity of 170 knots with a constant deceleration of 1.5 G maximum with no dynamic peaks for the heaviest aircraft and a landing speed of 138 knots of 1.0 G deceleration maximum for the lightest aircraft. Decelarations are maintained below 1.5 G for all other aircraft.

The landing speed of the lightest aircraft is represented in FIG. 2 by curve 52 which represents the landing speed of an Alpha jet weighing 13,400 lbs. and landing at approximately 115 knots. It crosses over trigger curve 50 only at the end of payout when shroud 32 is shifted into the "C" or high K position.

Curve 54 represents the landing speed of an intermediate weight F 104 weighing 17,500 lbs. landing at 180 knots. This curve crosses over trigger curve 50 at about 10 feet of payout when cylinder shell 15' and shroud 32 are moved into their intermediate "B" positions to provide an intermediate K factor for the energy absorber throughout the remainder of payout when the final crossover provides the high K position.

Curve 56 on FIG. 2 represents a heavy weight F-4 aircraft weighing 59,000 lbs. and landing at 160 knots. It crosses over trigger curve 50 at about 20 feet of payout to shift shroud 32 into the "B" intermediate K position. It again crosses over trigger curve 50 at about 320 ft. to cause cylinder shell 15' shroud 32 and energy absorber 40 to move into the extreme high K position throughout the remainder of the arrestment.

The G forces applied to light, intermediate and heavy aircraft are thus maintained approximately between 1.0 and 1.5 G throughout their arrestment utilizing a single program or cam contour.

I claim:
1. A programmed aircraft arresting control system for a variable K factor energy absorber having a payout over its arrestment and a movable control element which is movable into only a small limited number of pre-established positions each causing the energy absorber to operate at a different pre-established K factor, comprising a drive means connected to the control element for moving the control element into only the small limited number of positions a fixed programming means establishing a predetermined program having a predetermined speed parameter vs. payout for an aircraft being arrested by the aircraft arresting system, speed sensing means for determining the instantaneous speed of the arrested aircraft, comparison means for comparing the instantaneous speed with the corresponding portion of the speed vs. payout parameter of the program whereby aircraft speeds in excess of the parameter are detected, actuating means connected between the comparison means and the drive means, and the actuating means being constructed and arranged and operatively associated with the program- ming means to cause the control element to move to a predetermined higher K position if the speed parameter is exceeded in a corresponding phase of arrestment.

2. A system as set forth in claim 1, wherein the predetermined speed parameter includes an initial phase and a final phase, the actuating means being constructed and arranged to actuate the drive means to set the control element in a low K position at the beginning of the initial phase, in an intermediate K position if the speed parameter is exceeded during the initial phase and in a high K position if the speed parameter is exceeded during the final phase.

3. A system as set forth in claim 2, wherein the actuating means is also constructed and arranged to cause the control element to be moved to the high K position at the end of the final phase if the control element is not already there.

4. A system as set forth in claim 1, wherein a rewind control is connected to the actuating means, and the rewind control being constructed and arranged to cause the control element to be set in a low K position to facilitate rewind.

5. A programmed aircraft arresting control system for a variable K factor energy absorber having a payout over its arrestment and a movable control element which is movable into a small limited number of pre-established positions each causing the energy absorber to operate at a different pre-established K factor, comprising a drive means connected to the control element for moving the control element into the small limited number of positions, a programming means establishing a predetermined program having a predetermined speed parameter vs. payout for an aircraft being arrested by the aircraft arresting system, speed sensing means for determining the instantaneous speed of the arrested aircraft, comparison means for comparing the instantaneous speed with the corresponding portion of the speed vs. payout parameter of the program whereby aircraft speeds in excess of the parameter are detected, actuating means connected between the comparison means and the drive means, and the actuating means being constructed and arranged and operatively associated with the programming means to cause the control element to move to a predetermined higher K position if the speed parameter is exceeded in a corresponding phase of arrestment, the predetermined speed parameter includes an initial phase and a final phase, the actuating means being constructed and arranged to actuate the drive means to set the control element in a low K position at the beginning of the initial phase, in an intermediate K position if the speed parameter is exceeded during the initial phase and in a high K position if the speed parameter is exceeded during the final phase, the actuating means is also constructed and arranged to cause the control element to be moved to the high K position at the end of the final phase if the control element is not already there, the drive means has a low K, an intermediate K and a high K position, a limit switch being disposed in the path of the drive means for determining the intermediate K position whereby the limit switch terminates movement of the drive means at the intermediate K position if the speed parameter is exceeded in the initial phase, the programming means has a disabling means connected to the limit switch whereby the control element is caused to move to the high K position if the speed parameter is exceeded during the final phase.

6. A programmed aircraft arresting control system for a variable K factor energy absorber having a payout over its arrestment and a movable control element which is movable into only a small limited number of pre-established positions each causing the energy absorber to operate at a different pre-established K factor, comprising a drive means connected to the control element for moving the control element into only the small limited number of positions, a fixed programming means establishing a predetermined program having a predetermined speed parameter vs. payout for an aircraft being arrested by the aircraft arresting system, speed sensing means for determining the instantaneous speed of the arrested aircraft, comparison means for comparing the instantaneous speed with the corresponding portion of the speed vs. payout parameter of the program whereby aircraft speeds in excess of the parameter are detected, actuating means connected between the comparison means and the drive means, and the actuating means being constructed and arranged and operatively associated with the programming means to cause the control element to move to a predetermined higher K position if the speed parameter is exceeded in a corresponding phase of arrestment, the drive means is constructed and arranged to have a faster rate of movement in the initial phase and a slower rate of movement during the final phase.

7. A system as set forth in claim 6, wherein the drive means is constructed and arranged to provide faster rate of movement after the completion of the arrestment.

8. A system as set forth in claim 6, wherein the drive means is constructed and arranged to provide the faster rate of movement at the completion of the arrestment, drive means comprises a piston and cylinder means, and a limit switch is disposed in the path of movement of the piston and cylinder means for establishing the intermediate K position thereof.

9. A programmed aircraft arresting control system for a variable K factor energy absorber having a payout over its arrestment and a movable control element which is movable into only a small limited number of pre-established positions each causing the energy absorber to operate at a different pre-established K factor, comprising a drive means connected to the control element for moving the control element into only the small limited number of positions, a fixed programming means establishing a predetermined program having a predetermined speed parameter vs. payout for an aircraft being arrested by the aircraft arresting system, speed sensing means for determining the instantaneous speed of the arrested aircraft, comparison means for comparing the instantaneous speed with the corresponding portion of the speed vs. payout parameter of the program whereby the aircraft speeds in excess of the parameter are detected, actuating means connected between the comparison means and the drive means, and the actuating means being constructed and arranged and operatively associated with the programming means to cause the control element to move to a predetermined higher K position if the speed parameter is exceeded in a corresponding phase of arrestment, the programming means comprises a cam having a contour, and the contour corresponding to the speed parameter required to substantially equalize the "G" forces applied to the aircraft by the system throughout an arrestment.

10. A programmed aircraft arresting control system for a variable K factor energy absorber having payout over its arrestment and a movable control element which is movable into a small limited number of pre-established positions each cause the energy absorber to operate at a different pre-established K factor, comprising a drive means connected to the control element for moving the control element into the small limited number of positions, a programming means establishing a predetermined program having a predetermined speed parameter vs. payout for an aircraft being arrested by the aircraft arresting system, speed sensing means for determining the instantaneous speed of the arrested aircraft, comparison means for comparing the instantaneous speed with the corresponding portion of the speed vs. payout parameter of the program whereby aircraft speeds in excess of the parameter are detected, actuating means connected between the comparison means and the drive means, and the actuating means being constructed and arranged and operatively associated with the programming means to cause the control element to move to the predetermined higher K position if the speed parameter is exceeded in a corresponding phase of arrestment, the programming means comprises a cam and follower means, the speed sensing means comprises a linkage connected to the energy absorber whose position is adjusted to correspond to the instantaneous speed of the energy absorber and aircraft which the energy absorber is arresting, a trigger switch which comprises the comparison means on the follower means, and the linkage being operatively associated with the trigger switch whereby the linkage contacts the trigger switch to operate the trigger switch when the instantaneous speed of the landing aircraft exceeds the speed parameter established by the cam and follower means.

11. A system as set forth in claim 10, wherein the cam and follower means includes an auxiliary follower switch which is connected to the limit switch to disable the limit switch when the corresponding phase of the speed parameter is completed.

12. A programmed aircraft arresting control system for a variable K factor energy absorber having a payout over its arrestment and a movable control element which is movable into a small limited number of pre-established positions each causing the energy absorber to operate at a different pre-established K factor, comprising a drive means connected to the control element for moving the control element into the small limited number of positions, a programming means establishing a predetermined program having a predetermined speed parameter vs. payout for an aircraft being arrested by the aircraft arresting system, speed sensing means for determining the instantaneous speed of the arrested aircraft, comparison means for comparing the instantaneous speed with the corresponding portion of the speed vs. payout parameter of the program whereby aircraft speeds in excess of the parameter are detected, actuating means connected between the comparison means and the drive means, and the actuating means being constructed and arranged and operatively associated with the programming means to cause the control element to move to a predetermined higher K position if the speed parameter is exceeded in a corresponding phase of arrestment, the drive means comprises a piston and cylinder means, and a limit switch being disposed in the path of movement of the piston and cylinder means for establishing the intermediate K position thereof.

13. A system as set forth in claim 12, wherein the piston and cylinder means comprises a fixed piston and a movable cylinder shell, and the movable cylinder shell being connected to the control element.

14. A programmed aircraft arresting control system for a variable K factor energy absorber having a payout over its arrestment and a movable control element which is movable into a small limited number of pre-established positions each causing the energy absorber to operate at a different pre-established K factor, comprising a drive means connected to the control element for moving the control element into the small limited number of positions, a programming means establishing a predetermined program having a predetermined speed parameter vs. payout for an aircraft being arrested by the aircraft arresting system, speed sensing means for determining the instantaneous speed of the arrested aircraft, comparison means for comparing the instantaneous speed with the corresponding portion of the speed vs. payout parameter of the program whereby aircraft speeds in excess of the parameter are detected, actuating means connected between the comparison means and the drive means, and the actuating means being constructed and arranged and operatively associated with the programming means to cause the control element to move to a predetermined higher K position if the speed parameter is exceeded in a corresponding phase of arrestment, the predetermined speed parameter includes an initial phase and a final phase, the actuating means being constructed and arranged to actuate the drive means to set the control element in a low K position at the beginning of the initial phase, in an intermediate K position if the speed parameter is exceeded during the initial phase and in a high K position if the speed parameter is exceeded during the final phase, the actuating means is also constructed and arranged to cause the control element to be moved to the high K position at the end of the final phase if the control element is not already there, the drive means has a low K, an intermediate K and a high K position, a limit switch being disposed in the path of the drive means for determining the intermediate K position whereby the limit switch terminates movement of the drive means at the intermediate K position if the speed parameter is exceeded in the initial phase, the programming means has a disabling means connected to the limit switch whereby the limit switch is disabled during the final phase whereby the control element is caused to move to the high K position if the speed parameter is exceeded during the final phase, the programming means comprises a cam and a follower means, the speed sensing means comprises a linkage connected to the energy absorber whose position is adjusted to correspond to the instantaneous speed of the energy absorber and the aircraft which the energy absorber is arresting, a trigger switch which comprises the comparison means on the follower means, and the linkage being operatively associated with the trigger switch whereby the linkage operatively contacts it when the instantaneous speed of the landing aircraft exceeds the speed parameter established by the cam and follower means.

15. A system as set forth in claim 14, wherein the cam and follower means includes an auxiliary follower switch which comprises the disabling means and is connected to the actuating means to disable the limit switch when the corresponding phase of the speed parameter is completed.

16. A programmed aircraft arresting control system for a variable K factor energy absorber having a payout over its arrestment and a movable control element which is movable into a small limited number of pre-established positions each causing the energy absorber to operate at a different pre-established K factor, comprising a drive means connected to the control element for moving the control element into the small limited number of positions, a programming means establishing a predetermined program having a predetermined speed parameter vs. payout for an aircraft being arrested by the aircraft arresting system, speed sensing means for determining the instantaneous speed of the arrested aircraft, comparison means for comparing the instantaneous speed with the corresponding portion of the speed vs. payout parameter of the program whereby aircraft speeds in excess of the parameter are detected, actuating means connected between the comparison means and the drive means, and the actuating means being constructed and arranged and operatively associated with programming means to cause the control element to move to a predetermined higher K position if the speed parameter is exceeded in a corresponding phase of arrestment, the drive means comprises a piston and cylinder means, and a limit switch is disposed in the path of movement of the piston and cylinder means for establishing the intermediate K position thereof.

17. A system as set forth in claim 1, wherein the drive means is constructed and arranged to have a faster rate of movement in the initial phase and a slower rate of movement during the final phase, the drive means comprises a piston and cylinder means, and a limit switch is disposed in the path of movement of the piston and cylinder means for establishing the intermediate K position thereof.

18. A system as set forth in any one of claims 16, 17 and 8, wherein the piston and cylinder means comprises a fixed piston and a movable cylinder shell, and the movable cylinder shell being connected to the control element.

19. A system as set forth in claim 18, wherein the drive means comprises a hydraulic drive system.

* * * * *